April 13, 1937.  E. G. GREEN  2,077,169
FURNACE
Filed July 5, 1934　　2 Sheets-Sheet 1
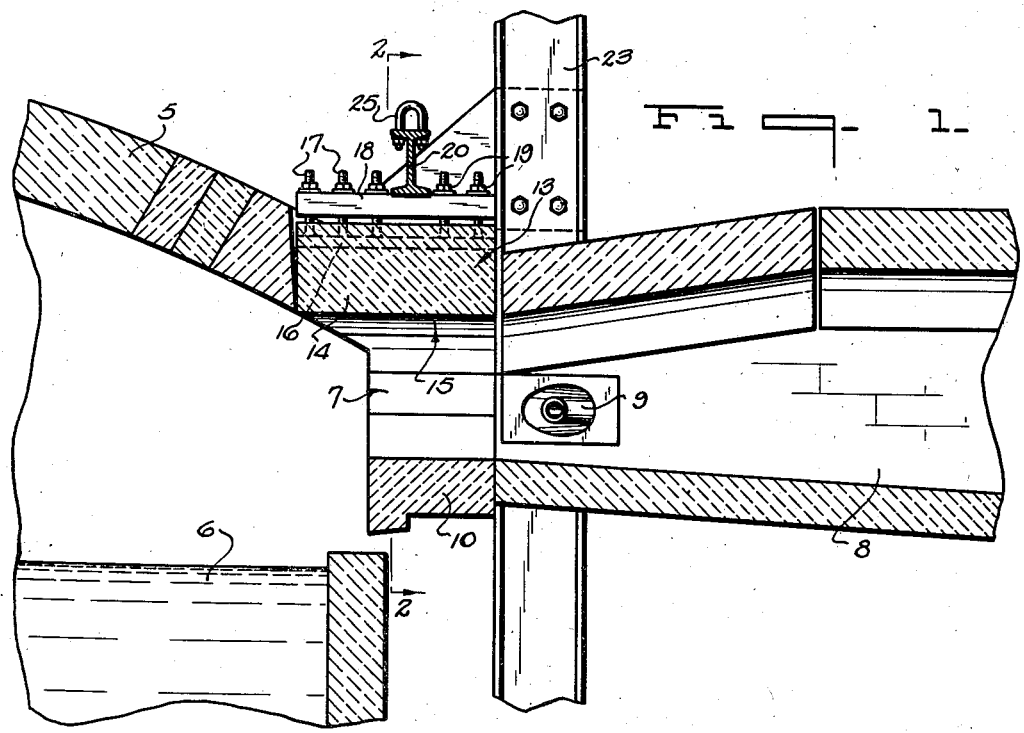
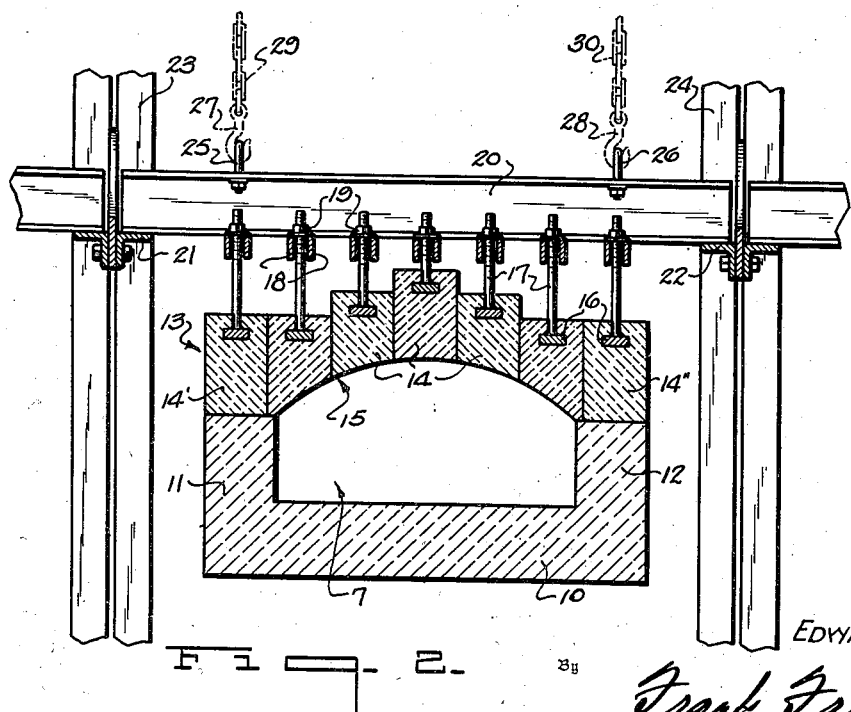
Inventor
EDWARD G. GREEN.
Frank Fraser
Attorney April 13, 1937. E. G. GREEN 2,077,169
FURNACE
Filed July 5, 1934 2 Sheets-Sheet 2
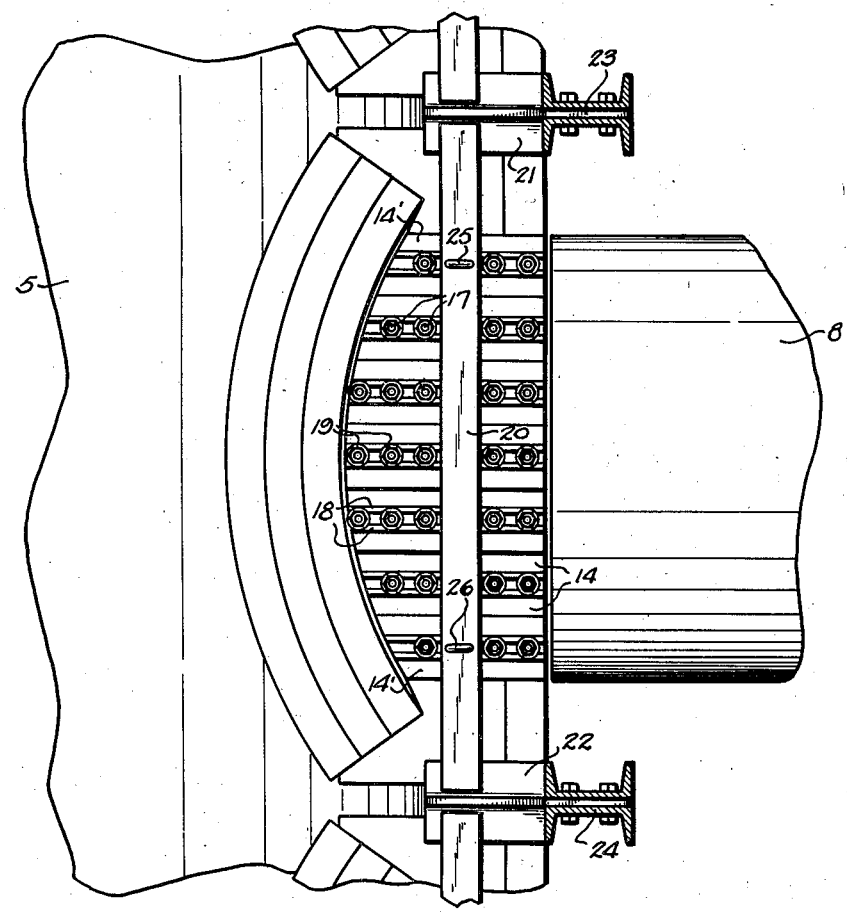
Fig. 3
Fig. 4
Inventor
EDWARD G. GREEN.
By 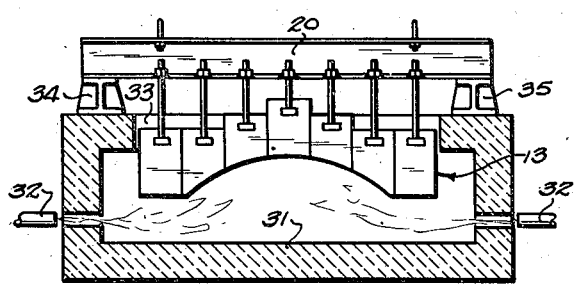
Attorney Patented Apr. 13, 1937

2,077,169

UNITED STATES PATENT OFFICE 2,077,169

FURNACE

Edward G. Green, Charleston, W. Va., assignor to Libbey-Owens-Ford Glass Company, Toledo, Ohio, a corporation of Ohio Application July 5, 1934, Serial No. 733,755

2 Claims. (Cl. 263—46)

The present invention relates broadly to melting furnaces and more particularly to improvements in the fuel ports thereof.

Although this invention is especially adapted for use in connection with glass melting furnaces, it is of course not restricted thereto. In the usual glass melting furnace of the regenerator type, however, heated air is conducted to the furnace through a closed passage terminating in a fuel port in the side wall of the furnace somewhat above the glass level and gas is injected into this heated air from nozzles extending through the side walls of the air passage adjacent the port.

In this type of furnace, the ports are subjected to relatively high temperatures and it has been found that these temperatures have a particularly adverse effect upon the arches thereof, causing them to burn out relatively quickly, necessitating frequent repairs and replacements. This is especially true when the furnace is being used for supplying molten glass to a plate glass forming machine, since in so-called plate glass furnaces it is necessary to maintain a relatively higher temperature than in so-called sheet glass furnaces which supply molten glass to window glass forming machines.

An important object of the invention resides in the provision of a fuel port of novel and improved design permitting ready and convenient repair or replacement of the arch thereof when it becomes worn or burned out without materially affecting the operation of the furnace.

Another object is the provision of an improved design of fuel port embodying a bodily removable arch unit so that when the same becomes worn or burned out, a complete new arch unit may be easily and quickly substituted therefor and while the furnace is in operation.

A further object is the provision of an improved design of fuel port and method of replacing the arch thereof when it becomes worn or burned out, said method contemplating the preheating of a new and completely assembled arch unit to a desired temperature at a point removed from the furnace, and in then effecting the bodily substitution of the new arch while in such preheated condition for the old arch and during the operation of the furnace, thereby obviating any tendency for the new arch to be broken or cracked upon being subjected suddenly to the intense heat of the furnace.

Other objects and advantages of the invention will become more apparent during the course of the following description when taken in connection with the accompanying drawings.

In the drawings wherein like numerals are employed to designate like parts throughout the same, Fig. 1 is a transverse vertical section through a portion of a glass melting furnace showing the improved fuel port provided by the present invention incorporated therein, Fig. 2 is a transverse vertical section taken substantially on line 2—2 of Fig. 1, Fig. 3 is a plan view of Fig. 1, and Fig. 4 is a transverse sectional view through one type of heating chamber which may be employed for preheating the port arch unit prior to being placed in operative position.

Referring to the drawings, at 5 is shown a portion of a glass melting furnace which contains the pool of molten glass 6. Adapted to be arranged along each side of the furnace are a plurality of fuel ports 7 and communicating with each port is a substantially horizontal air passage 8 preferably leading from a suitable regenerative heating means not shown. The air for combustion purposes is drawn in through the passage 8 and enters the furnace chamber above the molten glass through the port 7. The gas is fed into the air passage 8 adjacent port 7 from nozzles 9 extending through the side walls of the said passage adjacent said port. The gas burns with the oxygen of the heated air to form the fire which melts the glass producing materials.

The present invention is concerned particularly with the novel and improved construction of the fuel port 7 and, as shown in the drawings, this port comprises a horizontal bottom wall 10, spaced vertical side walls 11 and 12, and an arch 13. This arch is made up of a plurality of refractory blocks 14 arranged side by side in contacting relationship, with the two outer or end blocks 14' and 14" being disposed above and resting freely upon the side walls 11 and 12 respectively to form a substantially closed port. The bottom surfaces of the remaining blocks are cut on an arc as indicated at 15.

According to the invention, the refractory blocks forming the arch are adapted to be tied together so that they are movable bodily as a unit into and out of operative position to the end that when the arch unit 13 becomes worn or burned out, it can be readily removed from the furnace and a new arch unit substituted therefor, this substitution being effected during the operation of the said furnace. Thus, there is embedded within each of the refractory blocks a horizontally disposed bar 16 carrying or having formed integral therewith a plurality of vertical bolts 17, said bolts passing upwardly between the pairs of spaced parallel metal strips 18 and having threaded upon their upper ends nuts 19. Upon rotation of the nuts 19, the blocks 14 can be properly adjusted relative to one another.

The strips 18 are welded or otherwise suitably secured to the bottom of a horizontal I-beam 20 extending at right angles to the said strips and being supported at its opposite ends upon angle brackets 21 and 22 carried by the vertical buckstays 23 and 24 respectively. From the above, it will be seen that upon movement of the supporting beam 20, all of the refractory blocks forming the arch will be moved as a unit. To effect the removal of the arch unit 13, the supporting beam may be provided with a pair of eyebolts 25 and 26 with which are detachably engaged hooks 27 and 28 respectively carried by chains 29 and 30 depending from a suitable crane or hoist adapted to travel above the furnace.

With the above described arrangement, it will be readily apparent that upon burning out of the arch 13, the arch unit can be bodily removed from the furnace and that likewise a new arch unit can be readily and conveniently substituted therefor. Moreover, that the substitution of a new arch unit for the worn arch unit can be accomplished during the operation of the furnace.

In order to prevent the new arch unit from becoming broken or cracked upon being subjected initially to the intense heat of the furnace, and which might occur were the new arch installed while cold, the present invention contemplates the preheating of the new arch unit prior to its being associated with the furnace. The arch, after being first completely assembled, is heated up to the same or substantially the same temperature that it will be subjected to in the furnace, so that upon its being installed in the furnace, it will not be subjected to any sudden shock or change in temperature which might adversely affect the same. Any suitable means may be provided for preheating the arch unit such as, for example, the heating chamber 31 illustrated in Fig. 4, said chamber being heated by burners 32. The top of this chamber is provided with an opening 33 through which the arch unit can be lowered into the chamber, the supporting beam 20 of the arch unit being supported upon beams 34 and 35 carried by the top of the said chamber. This invention, therefore, not only contemplates the provision of an improved design of fuel port but also the provision of an improved method of replacing the port arch when it becomes worn or burned out. Thus, when it is desired to replace a burned out arch, a new arch is first completely assembled so that it can be moved as a unit, after which this arch unit is heated to a desired temperature within the heating chamber 31. After being brought to the proper temperature, the burned out arch unit is adapted to be bodily removed from the furnace and the new and preheated arch unit bodily substituted therefor.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a furnace construction, the combination of a heating chamber and a substantially horizontal fuel port at one side thereof communicating therewith, the port structure comprising a horizontal bottom wall, spaced substantially vertical side walls and an arch, said arch embodying a plurality of vertically disposed refractory blocks arranged side by side in freely contacting relation with the two outer blocks being disposed above and resting freely upon said side walls to form a substantially closed port, means for supporting said blocks and for effecting vertical adjustment thereof relative to one another, and means for moving said blocks as a unit into or out of operative position.

2. In a furnace construction, the combination of a heating chamber and a substantially horizontal fuel port at one side thereof communicating therewith, the port structure comprising a horizontal bottom wall, spaced substantially vertical side walls and an arch, said arch embodying a plurality of vertically disposed refractory blocks arranged side by side in freely contacting relation, with the two outer blocks being disposed above and resting freely upon said side walls to form a substantially closed port, a supporting member, means carried by said supporting member for supporting said blocks and by means of which the blocks may be adjusted vertically relative to one another, and means associated with said supporting member for effecting bodily movement of the arch into or out of operative position.

EDWARD G. GREEN.